(12) United States Patent
Helvajian et al.

(10) Patent No.: US 6,952,530 B2
(45) Date of Patent: Oct. 4, 2005

(54) INTEGRATED GLASS CERAMIC SYSTEMS

(75) Inventors: Henry Helvajian, Pasadena, CA (US); Siegfried W. Janson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 88 days.

(21) Appl. No.: 10/741,795

(22) Filed: Dec. 19, 2003

(65) Prior Publication Data
US 2005/0135724 A1   Jun. 23, 2005

(51) Int. Cl.[7] .............................................. H04B 10/00
(52) U.S. Cl. ...................... 398/128; 398/121; 398/124; 398/125; 398/132; 385/14
(58) Field of Search ..................... 385/14, 147, 88–94; 398/118, 121, 124, 125, 128–132, 135–139, 398/140, 182, 201, 202, 212

(56) References Cited

U.S. PATENT DOCUMENTS

| | | | | |
|---|---|---|---|---|
| 5,200,631 A | * | 4/1993 | Austin et al. ................. 257/570 |
| 5,333,225 A | * | 7/1994 | Jacobowitz et al. ........... 385/93 |
| 5,337,388 A | * | 8/1994 | Jacobowitz et al. .......... 385/76 |
| 6,444,390 B1 | * | 9/2002 | Yamazaki et al. .......... 430/166 |
| 6,477,284 B1 | * | 11/2002 | Oda et al. ....................... 385/14 |
| 6,605,497 B2 | * | 8/2003 | Yamazaki et al. ........... 438/166 |
| 6,694,069 B2 | * | 2/2004 | Kaneko et al. ................ 385/14 |
| 6,789,956 B2 | * | 9/2004 | Iwaki et al. ................... 385/88 |
| 6,890,805 B2 | * | 5/2005 | Yamazaki et al. ........... 438/166 |
| 2002/0102072 A1 | * | 8/2002 | Chan et al. .................... 385/89 |
| 2004/0184737 A1 | * | 9/2004 | Oono et al. .................... 385/52 |
| 2005/0053336 A1 | * | 3/2005 | Ilo et al. ........................ 385/89 |

* cited by examiner

*Primary Examiner*—Akm Enayet Ullah
*Assistant Examiner*—Kevin S. Wood
(74) *Attorney, Agent, or Firm*—Derrick Michael Reid

(57) ABSTRACT

Integrated glass ceramic spacecraft include a plurality of glass ceramic components including molded, tempered, annealed, and patterned glass ceramic components coupled together for forming a support structure or frame or housing through which is communicated optical signals through an optical communications grid and electrical signals through an electrical communications grid, with the optical communications grid and electrical communication grid forming a composite electrooptical communications grid for spacecraft wide intercommunications. The support structure multifunctions as a frame, a housing, a support, a thermal control system, and as part of an electrooptical communications grid while encapsulating a plurality of optical, electronic, electrical, and MEMS devices between which is communicated the electrical and optical signals over the electrooptical communication grid.

19 Claims, 2 Drawing Sheets

GLASS CERAMIC PHONE

GLASS CERAMIC PHONE

GLASS CERAMIC SPACECRAFT

US 6,952,530 B2

INTEGRATED GLASS CERAMIC SYSTEMS

STATEMENT OF GOVERNMENT INTEREST

The invention was made with Government support under contract No. F04701-00-C-0009 by the Department of the Air Force. The Government has certain rights in the invention,

REFERENCE TO RELATED APPLICATION

The present application is related to applicant's copending application entitled Glass Ceramic Spacecraft Ser. No. 10/742,058, filed Dec. 19, 2003, by the same inventors.

FIELD OF THE INVENTION

The invention relates to the fields of industrial art for making glass and ceramic components, tool and die arts for making molded glass and ceramic components, photostructurable arts for laser milling glass and ceramic components, semiconductor arts for fabricating semiconductors and hybrids, and for depositing conductor traces in an electrical communications grid, microelectromechanical arts for making active and passive MEMS devices, wafer flip and bond art for encapsulating electrical devices, MEMS devices, and optical devices, electrical arts for making batteries, power converters, and RF antennae, electronic arts for making processors, electronic components, optoelectronic interfaces, RF transmitters, RF receivers, and despreading correlators, electromechanical arts for making active gyros, and accelerometers, photonic arts for making optical transceivers, optical detectors, mirrors, splitters, reflectors, polarizers, lenses, and optical fibers for communicating and processing optical signals for use in an optical communications grid, all for use and incorporation into a new field of integrated glass ceramic systems having structural elements formed from molded and patterned glass ceramic materials with internally communicated optical and electrical signals while also having encapsulated electronic, photonic, electrical and microelectromechanical system devices intercommunicating through an internal electrooptical communications grid.

BACKGROUND OF THE INVENTION

There are a vast variety of conventional fabrication methods and devices used from a variety of operational systems. As examples, industrial arts have been used for making glass and ceramic components. The tool and die arts have been used for making molded glass and ceramic components. Molded components include poured, injected and stamped glass ceramic components. The semiconductor arts have been used for fabricating semiconductors, chips, and hybrids. During fabrication, depositing conductor traces and with feedthroughs are used to form an electrical communications grid about the semiconductor components. The microelectromechanical systems (MEMS) arts have been used for making active and passive MEMS sensors and actuators, among others devices. The wafer flip and bond arts have been used for electrically connecting and encapsulating electrical devices, MEMS devices, and optical devices within flip-bonded semiconductor and ceramic substrates. The electrical arts have been used for making batteries, power converters, communications processors, and RF antennae, among others. The electronic arts have been used for making power supplies, electronic devices, optoelectronic devices, RF transmitters, RF receivers, and despreading correlators, among others. The electromechanical arts have been used for making active gyros, and accelerometers, among others. The photonic arts for have been used for making optical transceivers, optical detectors, mirrors, splitters, reflectors, polarizers, lens, and optical fibers, among others, for communicating and processing optical signals for use in an optical communications grid. While there is a vast array of technologies available, system integration of various technology is limited due to operational compatibility and fabrication feasibility.

One example of an intertechnology integrated system is a conventional satellite. A satellite can be made of silicon for exploiting strength, high thermal conductivity, infrared transparency, and radiation-shielding properties of silicon along with established silicon microelectronics and microelectromechanical systems fabrication techniques to create satellites composed of silicon components. Silicon is an excellent choice as the main material for a spacecraft, but bulk mechanical, thermal, and optical properties cannot be significantly modified.

Glass materials have an amorphous state that is a non-crystalline state. Ceramic materials have a crystalline state. Ceramic materials are tougher than glass but also tend to be more brittle than the glass, and hence not generally suitable as a support structure in high tensile stress application. Glass is weaker than ceramic, and susceptible to breakage during wide temperature operating range variations, but glass has superior optical transmission characteristics and can be brittle. Ceramics can withstand higher temperatures than the glass, but have poor optical transmission characteristics. Glass and ceramic materials differ in material properties, such optical transmission, electrical conductivity, thermal conductivity, and chemical resistance, offering operational incompatibility, and unsuitability for common use in a given application. Glass materials have been annealed to reduce internal stresses and prevent cracking and breakage during cooling, especially for thick components. This is typically accomplished by heating glass to its softening temperature, followed by a slow cool-down process. Annealing decreases the overall strength of glass, but also makes the glass less brittle. Ceramic materials can also be annealed, but it is usually used to improve strength. Ceramic annealing changes crystal grain size. Glass materials have been tempered to increase internal compressive stresses for increasing the strength of the glass to external tensile loads. This is typically accomplished by heating glass to its softening temperature, followed by a rapid cool-down process. Ceramic materials are not tempered.

Glass ceramic materials have portions in the amorphous state and portions in the crystalline state. Glass ceramic materials incorporate an in-situ nucleation process that results in the crystallization of the amorphous glass phase. This conversion process is nominally called devitrification. Typically, glass stock is produced with additional ingredients that upon heating above a specified temperature, induces ceramization of the material. The bake method provides a material that is controllably devitrified, that is, a controlled in situ precipitation of crystalline material within an amorphous glass body. Beyond the known advantages of glass and ceramics, glass ceramic materials offer cost-effective manufacturing of shaped ceramic parts. The initial material in the glass phase is melted and molded into the desired shape and then converted to the crystalline ceramic state. Because the resulting material is not 100% crystalline, but a composite of amorphous and crystalline phases, it is less brittle than true crystalline ceramics. Glass ceramic materials are used in a wide range of applications from specialized optics to consumer cookware. Some well-known trade names are Macor which is machinable ceramic Corning Corporation, Dicor which is a biomaterial from Corning Corporation, Zerodur which is an expansion material from Schott Corporation, ML-05 which is a magnetic material from Nippon Electric Glass Company, and Pyroceram which is a cookware material from Corning Ware.

A special category of sensitized glass ceramic material is the photostructruable glass ceramic materials, also called photositalls and photocerams. Photostructruable glass ceramic materials differ from most glass ceramic materials in that photosensitive agents are incorporated into the raw material. Upon photo excitation, these agents initiate a reaction that can lead to nucleation and crystallization, that is, ceramization, of the glass during a controlled bake process. One set of bake cycles leads to the formation of a metastable crystalline state which is soluble in hydrofluoric acid (HF). Another set of bake cycles leads to the formation of a stable crystalline state that is resistant to etching by both acids and bases. Photostructurable glass ceramic materials can be photolithographically patterned, and upon baking, only those patterned areas would be converted to one of the ceramic states. The exposure process is typically done using a flood-fill light source through an opaque mask resting directly on top of the photostructurable glass ceramic material. Patterning of the photostructurable glass ceramic material can be done by creating the metastable state and etching away this state in HF. An additional flood exposure and bake to the stable crystalline state will result in a patterned ceramic component. One example of a photostructurable glass ceramic material is Foturan of Schott Glass Works, Mainz, Germany that requires ultraviolet light for photoexposure and baking to temperatures above 500C.

Photostructurable glass ceramic materials can also be patterned using lasers that selectively expose parts of the material. Photostructurable glass ceramic materials can be micromachined with three-dimensional precision as an optically patterned component by direct-write laser milling, direct-write laser exposure followed by a chemical etching step to remove exposed volumes, or by photolithographic patterning followed by a chemical etching step to remove patterned areas.

The photostructurable glass ceramic material can be used to make components for various applications. For example, photostructurable glass ceramic materials have been used as a substrate and structure component in a multi-thruster propulsion system for a spacecraft also having metallic structural components with coupled semiconductor electronics on printed circuit boards. The propellant tank, propellant feed lines, and thrusters are all composed of micromachined photostructurable glass ceramic material, while the remaining components include batteries, electromagnetic solenoid valves, the pressure and temperature sensors, the fill and drain valves, and the electronics. The glass ceramic thruster substrate is supported in a metallic support structure providing structural support for the spacecraft. One problem associated with conventional metallic support structure is the mix of various supporting components and their various differences in thermal expansion coefficients, thermal conductivity, and optical properties that need to considered over the operational temperature ranges. In addition, silicon and metallic support structures require the use of harnesses and cables to route electrical lines about the spacecraft. In addition, silicon and metallic support structures block visible optical transmission, limiting optical communications paths about the silicon or metallic support structures. Further, silicon and metallic support structures have different material strengths rendering portions providing uneven structural strength about the support structure. Further still, silicon and metallic support structures have limited molding and precise patterning manufacturing methods. These and other disadvantages are solved or reduced using the invention.

SUMMARY OF THE INVENTION

An object of the invention is to provide an integrated glass ceramic system having mixed glass ceramic components being molded and patterned glass and ceramic components for providing a variety of structural shapes.

Another object of the invention is to provide an integrated ceramic system having a support structure consisting of glass and ceramic components.

Yet another object of the invention is to provide an integrated glass ceramic system having glass ceramic composite components with tempered and untempered glass portions for providing enhanced structural strength.

Still another object of the invention is to provide an integrated glass ceramic system having a plurality of glass ceramic support structures integrated together for supporting an electrical and electronic communications grid.

A further object of the invention is to provide an integrated glass ceramic system having a plurality of glass ceramic support structures that are transmissive to various optical wavelengths for providing an optical communications grid.

Yet A further object of the invention is to provide an integrated glass ceramic system having a plurality of glass ceramic support structures that are transmissive to various wavelengths for providing an internal optical communications grid and for supporting an internal electrical and electronic communications grid combined as an electrooptical communications grid that includes structured glass sensors and actuators.

The invention is directed to integrated glass ceramic systems, in the general form, having patterned glass ceramic components having tempered and untempered portions within composite components, which when integrated together, form a glass ceramic support structure supporting an electrooptical communications grid while encapsulating and supporting operational components, such as photonic, electronic, electrical, and microelectromechanical (MEMS) devices. The direct-write glass ceramics components can be laser-milled, laser exposed and etched, or photolithographicly illuminated and etched glass ceramic components. In a preferred form, an integrated glass ceramic system is a glass ceramic spacecraft having a plurality of molded and patterned components integrated together for forming a support structure through and on which is supported the electrooptical communications grid.

The unique attributes of photostructurable glass ceramic materials include adapting the material for high transparency in the visible through the near IR wavelengths, designing the material for multifunctionality by locally altering a physical property, and by processing the material for patterned metallization. These attributes permit a wide range of functions that can serve the structural, thermal, electrical, and optical requirements of an integrated glass ceramic system. By selectively controlling the material processing, the photostructurable glass ceramic materials can simultaneously function as support structures, thermal control systems, radiation shields, optical conduits, multichip substrates, photonic supports, electronics supports, antenna supports, sensor structure, sensor support, actuator structure, actuator support, and microelectromechanical systems supports. This multifunctionality allows an entire integrated glass ceramic system to be substantially fabricated from a single material while supporting a plurality of integrated photonic, electronic, electrical, and MEMS devices. These capabilities offer predetermined consistent material strength, optical properties, electrical properties, thermal properties, and chemical properties. Composite ceramic structures can be fabricated through localized ceramization down to the micron scale. The photostructurable glass ceramic materials can have a glass phase that can be used for visible through near infrared optics passing wavelengths typically between 0.35 $\mu$m to 2.8 $\mu$m. Photostructurable glass formulations can be designed to enhance or extend these wavelength ranges. The photostructurable glass ceramic materials can be manufactured using molding and patterning methods to any dimension and to any shape.

The glass state in photostructurable glass ceramic materials can be tempered for improved strength by using a rapid cool-down process after baking. Another way to increase tensile strength is by selective exposure to light with subsequent baking to create crystalline domains in the glass. The crystalline domains in this composite material are stronger than the glass and their decreased density, compared to the glass state, generates a local compressive stress.

Glass ceramic materials include sensitized glass, thermally-tempered glass having increased internal stress for increased strength, crystal-tempered glass ceramic composites for increased strength, annealed glass having decreased internal stresses and smooth surface for enabling system integration, and ceramics having crystalline states made from sensitized amorphous glass. Glass and ceramics can have increased tempering in areas where high mechanical strength is desired, and can have reduced tempering in areas where mechanical or vibration compliance is desired or where a clearer optical path is desired or properties are desired that are more commensurate of the glass state of the original glass formulation. Ceramics can withstand higher temperatures and stresses than glass. A composite glass ceramic material can also be thermally-tempered to provide a more uniform stress response to a given load for improved mechanical toughness.

Photostructurable glass ceramic materials can be used to make spacecraft support structure, insulated circuit substrates, multichip module supports, actuators, sensors, and thermal control systems providing simultaneous multifunctionality. Almost all of the dry mass of a spacecraft, except for batteries and propellant, for example, can be composed of photostructurable glass and ceramic materials supporting operational photonic, electronic, electrical and MEMS devices. In the glass state, photostructurable glass and ceramic materials can be molded into any shape using low cost forming techniques, micromachined or macromachined to micron tolerances, metalized for forming an electronics communications grid, and then assembled into an integrated glass ceramic system through fusion bonding. The multifunctional properties of the photostructurable glass and ceramic materials and available low cost fabrication techniques enable photostructurable glass and ceramic materials to be used as a support structure in low-cost reproducible satellites. When tempered, the photostructurable glass and ceramic materials have substantially increased reliability against tension-induced fracture. Localized tempering can provide additional strength in a support structure where additional support strength is desirable. Tempered photostructurable glass and ceramic materials are electrical insulators, thermal insulators, and are transparent to visible through near IR light in the glass and glass ceramic composite phases.

That is, the photostructurable glass ceramic materials can be molded and patterned into any shape and composition, resulting in a wide range of structural, thermal, electrical, and optical properties. This multifunctionality allows almost an entire integrated spacecraft to be fabricated from photostructurable glass ceramic material. The photostructurable glass ceramic materials are amenable to material handling requirements found during conventional manufacturing. The photostructurable glass ceramic materials do not outgas chemicals, have zero porosity, and can be handled using clean-room protocols, and are therefore amenable to system integration using standard microelectronics fabrication processes. Valves, sensors, and actuators could also be fabricated using photostructurable glass ceramic materials with applied metal or polysilicon layers to provide electrodes or resistive structures for sensing and actuation.

A satellite can be made primarily of photostructurable glass ceramic materials with supported electronic, electrical, photonic, and MEMS devices. Spacecraft photonics and electronics are preferably integrated onto and encapsulated by glass ceramic substrates that multifunction as circuit boards. The encapsulation provides limited prevention of contamination. For example, a stack of integrated glass ceramic substrates can multifunction as a support structure while providing interface layers on which and through which are deposited conducting interconnects for forming an electrical communications grid about the support structure, and while providing internal optical paths for optical communication between optical transceivers for forming an optical communications grid about the support structure. Optical communications between and through the glass ceramic substrates of the support structure is enabled due to the wide transparency range of the glass phase of the photostructurable glass ceramic materials. Specific regions and volumes of the support structure are converted into the ceramic phase to provide enhanced dielectric properties for microwave circuits or to provide additional strength, while other regions and volumes are converted into the glass phase to provide enhanced internal optical communications.

The spacecraft thermal control for a glass ceramic satellite is very different from a silicon or metallic satellite. Photostructurable glass ceramic materials can have a low thermal conductivity of 1.35 W/m-K for the glass phase which is less than stainless steel or aluminum used in conventional spacecraft. Due to the optical and near infrared transparency of the photostructurable glass ceramic materials, less than ten percent of received solar energy will be absorbed in the material while almost all of the infrared energy from the earth will be absorbed. This thermal absorption smoothes the temperature ranges for a satellite in Earth orbit where a significant fraction of the orbit is in eclipse. The high thermal insulating aspects of photostructurable glass ceramic materials can be thermally limiting for high power components, such as microprocessors and communication circuits. Fabrication of three-dimensional micro heat pipes, which are metalized and help to direct the heat away from these sources, can mitigate this thermal limitation of the photostructurable glass ceramic materials. These and other advantages will become more apparent from the following detailed description of the preferred embodiment.

DETAILED DESCRIPTION OF THE PREFERRED EMBODIMENT

Figure 1:
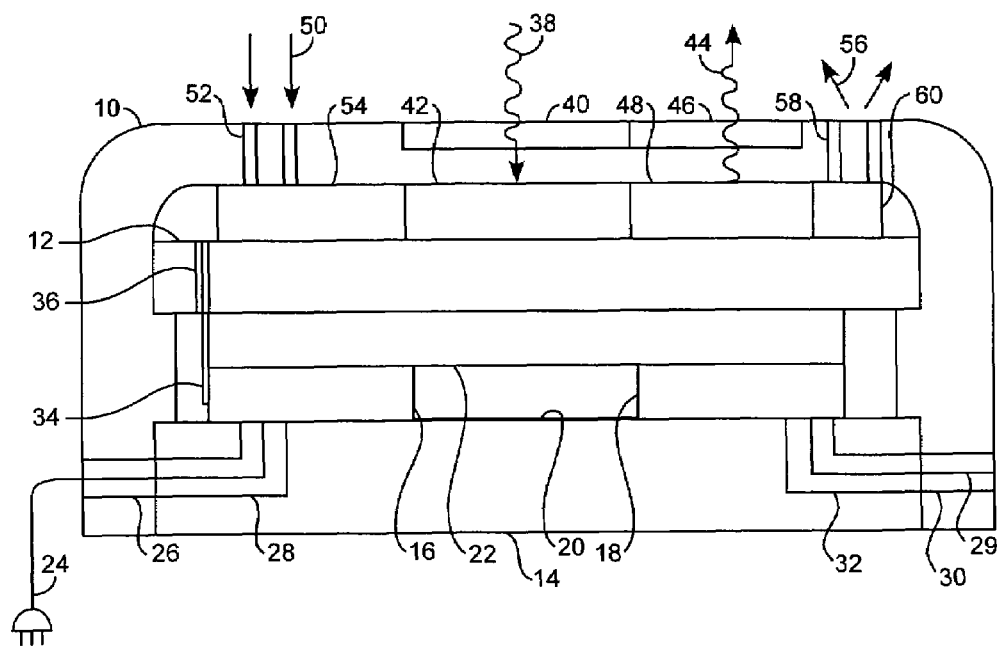
FIG. 1 is block diagram of a glass ceramic phone.

An embodiment of the invention is described with reference to the figures using reference designations as shown in the figures, Referring to FIG. 1, a glass ceramic phone, such as a cellular phone, can be adapted to include a variety of glass ceramic components in an all glass ceramic system. As used herein, a glass ceramic material is a material comprising glass or ceramic components, or both. A molded glass ceramic cover 10, a laser milled glass ceramic strut 12, and a laser milled glass ceramic base 14 form the structural components of the phone and collectively provide internal cavities for supporting encapsulated internal components. Internal to these structural components is a power converter 16 and a communications processor 18 connected together by horizontal interconnects 20. A thin film battery 22 is charged through an external power adapter 24 adapted for interface connection through a power cover feedthrough and a power base feedthrough 28 for connecting the power from the adapter 24 to the power converter 16. An internal antenna 29 is disposed in an antenna cover feedthrough 30 and an antenna base feedthrough 32 for transceiving telecommunications to the communications processor 18. The antenna can be a conductor of a predetermined length to radiate RF energy. The antennas can be composed of patterned electrically conducting materials to optimize RF radiation. The antenna 29 can be metallic or semiconducting. Discreet antennas can be patterned in the glass and ceramic materials using direct-write laser patterning or photolithographic techniques. Laser-patterning can provide complex three-dimensional structures such as a helical coil. When the glass and ceramic material has a high metal dopant concentration, the helical shape can be an embedded conductor to function as an antenna. When the material does not have the added dopant, the exposed material is then baked and etched to remove material to make a hollow helical structure which is then back filled with a conducting material.

Vertical interconnects 34 extend from the power converter 16 through vertical interconnect feedthrough 36 for distributing power and control signals. The feedthrough 36 is a channel or via that encapsulates a conductor. The interconnects 34 provide connectivity for RF and electrical signal in the vertical direction. Molded shape glass ceramic cover 10 is first molded to have appropriate overall design and then patterned to have optical feedthroughs or transparency for the transmission of optical signal and have acoustic feedthroughs for transmission of acoustic energy. The cover 10 protects the interior from the outside environment while providing an ergonomic shape for handling. The cover 10 protects the interior against contamination of dust, dirt, water, and chemicals when baked and tempered into the ceramic state. The glass ceramic materials, such as Foturan, can be first shaped with a mold in an oven at 300° C. to 460° C. The cooled shaped molded component is then transferred to a direct-write UV laser or UV light photolithography machine to expose areas to be removed. The molded component is then rebaked using a second baking cycle up to 600° C. maximum and then etched in about 5% hydrofluoric acid bath that is nominally at room temperature. The previously exposed regions are etched away. The sample is then baked a third time in an annealing oven of 300° C. to 500° C. to make optical paths more transparent. The cover 10 houses all the internal components providing IR, acoustic, and visual transparency, as well as electrical feedthroughs. The strut 12 provides mechanical support, visually clear in the glass state, that is an insulator at DC but also a very poor electrical conductor at high frequencies. A laser, preferably an ultrafast laser, such as a picosecond or femtosecond pulse width laser, is used to ablate and mill the glass to shape. Depending on whether the final structure is to be more like a ceramic or more like a glass, the milled structure is volumetrically exposed with UV light and baked to over 700° C. to become a ceramic, or simply baked at 500° C. followed by a rapid cool down in an oven to be tempered glass. The strut can function as an electrical substrate for electronic components while providing mechanical support and high optical transmission in the visible and IR for internal optical free-space communications. The base 14 provides additional support but has integral feed through vias for electrical and RF components. Via processing is also done using UV light patterned exposure, but can then be backfilled with conducting solid, paste, or gas, and then heated to make integral conducting vias. The base 14 is an electrical substrate for electronic components while providing mechanical support and high optical transmission in the visible and IR for optical free-space communications. The cover 10, strut 12, and base 14 form a glass ceramic support structure.

The power converter 16 converts one voltage to another as required by encapsulated electronic components. An electronic power converter circuit, preferably an integrated circuit, is disposed on the base 14. A recess, not shown, can be made in the base for securely mounting the power converter 16. The computer processor chip 18 controls the communication system through optical radiation or RF communications. A processor chip is preferably mounted in a recess made, not shown, in the glass and ceramic base 14. The communications processor 18 can be an RF integrated circuit or a multichip module with an RF coplanar waveguide, not shown, made in the substrate base 14. For an optical communications processor chip, the base 18 can be annealed to improve transparency for passing optical signals. The horizontal interconnects 20 are used for communicating electrical or RF energy on a horizontal plane between electrical and RF components. The interconnects can be a thin film conductor, but could also be a coated waveguide or a co-planar waveguide for high frequency through microwave frequency applications greater than 10 GHz. There are several techniques for patterning electrical conductors onto or into glass ceramic materials, including conventional standard microelectronics processing such as patterned sputtering, laser ablation and laser forward transfer process that deposits metal from a metalized ribbon, laser annealing following a direct write ink paste pen where the paste has conducting material, or glass and ceramic material doping with a high concentration of metal atoms where a laser is used to form thin metalized lines within the glass by laser coagulation of metal. For the RF communication where the interconnects 20 comprise waveguides, trenches are laser milled using the variable laser exposure technique followed by a bake and etch for where the material is to be removed. The trench is then coated with metal to function as a waveguide. The horizontal interconnects provide conduits for electrical and RF energy flow and communications about the integrated glass ceramic system. Thin film batteries provide local and distributed power to the encapsulated electrical devices. Thin film batteries can be made by laser ablation and depositing multiple materials using a patterning method by sputtering multiple layer of battery compounds through masks. The power adapter 24 permits charging of the battery 22 from an electrical outlet. The adapter can be a direct wire plug connector as shown, but because the integrated system can be made to be transparent to visible and IR light, the system could be powered by solar or other light power sources. The power cover feedthrough 26 enables the transfer of energy from an outside electrical power source to charge batteries as well as protecting inside components from contamination. For an optical power line, the system can be powered by a directed beam source, such as a laser. To fabricate an optical power adapter, a laser is used to create waveguides. An ultra fast laser is used to expose the material which is then baked at less than 500C to create an index of refraction change that will guide laser light through the glass and ceramic material. The power base feedthrough 28 is mated to the power cover feedthrough 26 either by direct electrical contact or by proximity contact for optical power transfer. As such, the integrated system has a power adapter and power storage elements for use with an electrical grid for power components distributed within the integrated glass ceramic system.

A received optical image 38, such as a terahertz or millimeter wave image, is received through an optical image lens 40, communicated through a portion of the molded cover, and received by an optical terahertz or millimeter wave image sensor 42, such as CCD camera, CMOS photosensor chip, microbolometer array, or a direct deposited thin film photosensor that converts light into electrical signals for receiving the received optical terahertz or millimeter wave image 38, such as a still image when the CCD camera operates as a still image camera. Light can be modulated or unmodulated, such as an unmodulated image or a modulated IR beam with encoded information. There are several approaches to make a lens. A diffractive lens is made by using a laser to laser mill or to expose followed by a bake and etch process to generate circular grooves of appropriate diameter, kerf width, and pitch, after the material has been removed. The lens is baked a second time to smooth out the kerf for making a diffractive planar lens that will focus onto the image sensor 42. Another approach is to create annular regions of metastable or ceramic material using a UV laser exposure followed by a bake cycle. The exposed portion will expand by a few percent and push clear glass within the annulus to create a convex surface, which will focus optical, terahertz, or millimeter wave optical signals below, Another approach is to use laser milling to shape a lens of any shape by directly removing material. The milled material is then baked for annealing and minor surface defect removal.

A transmitted optical image 44 is transmitted through a transmitter optical image lens 46 and originates from an optical display 48 for transmitted or displaying the transmitted optical image 44. The glass ceramic material between the display 48 and the outside is annealed to insure high-resolution low-loss optical transmission through the support structure. The lens 40 serves to focus incoming light onto a photosensor for efficient energy coupling. The display can be a typical cell phone readout, such as displaying a currently called telephone number and elapsed time of a conversation. The device can be make to communicate optical signals through the glass ceramic materials. The display can be an optical emitter with light passing through the glass ceramic material in the glass state. The glass and ceramic material in the glass state provides a vertical path to communicate optical signals or to transfer power.

A received audio signal 50 is received through received audio apertures 52 and sensed by an audio microphone processor 54 for receiving an audio signal such as a voice audio signal occurring during a typical telephone conversation. The audio signal could be encoded with digital information for information transfer. The audio apertures channel acoustic energy and focuses the acoustic energy to an electrical audio amplifier of the processor 54. Laser UV exposure and bake and etching is used to shape the three-dimensional apertures 52. Laser Milling can also be used to construct cylindrical via holes. A transmitted audio signal 56 is transmitted through transmitted audio apertures 58 and originates from an audio speaker processor 60 having speakers for generating the transmitted audio signal such as the reply conversation from a phone user to which the glass ceramic phone is currently communicating. Of course additional elements, such as a touch tone key pad, not shown, can be incorporated, as well as other desired buttons and controls.

The glass ceramic phone is characterized as having an all glass ceramic structural supports that are molded, patterned, or laser milled serving to internally encapsulate active operational components while enabling internal optical communications between the active components and physically through a portion of the structural support. In the preferred form, the converter 16, processors 18, battery 22, microphone 54, camera 42 and speakers 60 are all active components encapsulated within the glass ceramic components 10, 12, and 14, with internal optical communications extending from the display 48 to and including the lens 46, and through a portion of the structural components, and particularly through a portion of the molded cover 10. The upper molded cover 10 and lower base can be made of tempered glass for improved structural strength about the exterior of the phone.

Figure 2:
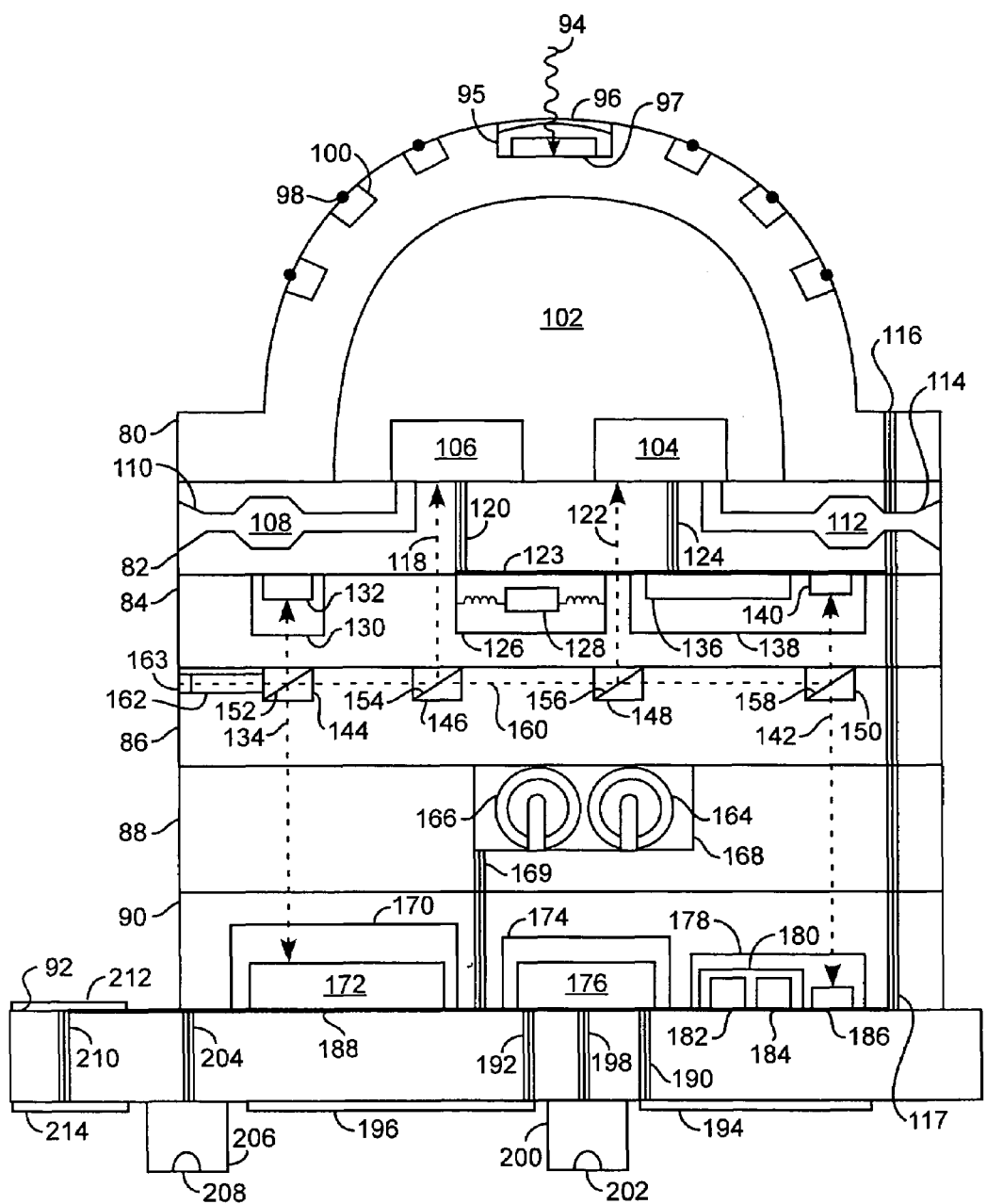
FIG. 2 is block diagram of a glass ceramic spacecraft.

Referring to FIG. 2, another example of an all glass ceramic system is the glass ceramic spacecraft. The spacecraft includes structural elements, such as a laser milled and molded glass ceramic dome 80, a laser milled glass ceramic thruster substrate 82, a laser milled glass ceramic sensor substrate 84, a laser milled glass ceramic optical substrate 86, a laser milled glass ceramic battery substrate 88, a laser milled glass ceramic processor substrate 90, and a laser milled glass ceramic antenna substrate 92. The dome 80 and substrates 82, 84, 86, 88, and 90 are bonded together to form a single all glass ceramic rigidly-integrated support structure in which is encapsulated many active and passive components and through which is communicated optical signals. Laser patterning composed of exposing, baking and etching, can also be used to replace or augment laser milling.

The dome 80 is a molded glass ceramic component in that molten glass is injected or poured, for examples, into a mold, not shown, for providing the substantially curved inner and outer surfaces of the dome 80. The dome 80 is shaped to efficiently serve as a pressure tank and a radome while providing feedthroughs for power and RF signals. The dome 80 provides a three-dimensional structure for mounting antennas, a radome for external or embedded antennas, and a pressure containment system. The convex shape also enables wide beam-pointing angles for phased array antennas, or the use of multiple antennas pointing in different directions. The glass and ceramic material, such as Foturan, is first shaped with a mold in an oven at 300° C. to 460° C., then cooled and transferred to a UV laser or UV light lithography machine to expose areas to be removed. The molded shape is then rebaked to 600° C. maximum and then etched in about 5% hydrofluoric acid bath nominally at room temperature. The exposed regions are etched away. The sample is then baked a third time in an annealing oven from 300° C. to 500° C. to make the optical paths more transparent.

The thruster substrate 82 has shaped channels that guide gas, fluid, or particle flow in either subsonic or supersonic flow to thrusters or pneumatic components. The thruster substrate 82 also provides structural support. The thruster substrate 82 can be milled with an ultrafast picosecond or femtosecond pulse width laser to efficiently ablate the glass with very high precision. The laser beam is directed across the substrate surface using CADCAM control software. The thruster substrate 82 can be made by etching when nozzle shapes and fluid channels are fabricated in the material by direct-write UV laser patterning or UV photolithography. The material is then baked at a maximum temperature of 600° C. and then etched in about 5% hydrofluoric acid to remove the exposed regions. The channels and nozzles can be fabricated on the top or bottom surface using either the UV photolithographic or UV direct-write laser approach. Embedded channels can be made using the direct-write approach when the laser is focused within the substrate and the beam dose is controlled so that it only exposes the material in the focal volume region where the laser beam comes to a focus.

The sensor substrate 84 serves as a holder for electrical die and components and can be a multichip module substrate that also functions as part of the spacecraft support structure. Power and data are routed via electrical feedthroughs and optical paths among the sensors, actuators, and control processors. A layout and interconnection pattern is first generated, and a surface topography pattern is created based on component layout on the surface and individual component heights. Recesses of various depths can be used to provide cleared volumes for various components between the sandwiched glass and ceramic substrates. The glass and ceramic material is patterned by UV laser direct-write exposure and baked and etched while an ultrafast laser is used to pattern sections that have to be milled and cannot be baked and etched. When the material is to be etched, it is first baked then etched. When milled, the material can annealed by baking using a low temperature bake cycle of less than 450° C. The die and supporting components are placed into the recesses in the substrate. Solder bump or other space-qualified component interconnect technology such as conductive epoxies can be used to affix the die and other components in the recesses of the substrate. Interconnecting lines for conducting electrical signal can be patterned. When the interconnect is for an optical emitter, then no processing is required as the glass will pass the light, When the interconnect is for RF or electrical feedthrough interconnection, then there are several techniques for patterning electrical conductors onto glass and ceramic materials. Conventional photolithographic patterning of a deposited layer, laser ablation and material forward transfer processing, laser annealing following a direct-write ink paste pen where the paste contains conducting material, doping glass ceramic material with a high concentration of metal atoms where a laser is used to form thin metalized lines within the glass by metal precipitation, or laser or photolithographic patterning of the surface followed by conductor deposition and chemical and mechanical polishing to leave conductive trenches, can be used. For RF waveguides, trenches can be made using the variable laser exposure technique to expose and bake and etch the material where materials are to be removed. The trench is then coated with metal. The sensor substrate serves as a complex multilayer electronic and photonic substrate that also provides structure and thermal heat-sinking of sensor components.

The optical substrate 86 supports optical processing components. Recesses are formed in the substrate for optical processing devices. Optical waveguides that direct the light beam to a particular direction or free-space transmission regions where a light beam is directed within the glass, are then patterned, For the waveguides, an ultrafast laser with low power is used to expose the glass locally in the pattern of the waveguide shape with vertical lines and horizontal lines. The glass is then baked so that it partially crystallizes at less than 600° C. that causes a change in the index that is sufficient to guide red light or IR light over many centimeters. Free-space communication in the glass ceramic material is also possible in the visible or IR. Where it is necessary to change the direction of the laser beam, a slot is cut either by laser milling or by UV exposure and bake and etch. The resulting slot is then annealed slowly at less than 500° C. to smooth the slot-walls to sub-micron flatness. The slot-walls with an air gap then become internally-reflecting mirrors within the optical substrate to direct the light traveling within the glass to the appropriate sensor, detector, or power absorber. The optical substrate provides optical paths and processing devices for optical communications and optical power transfer throughout the substrate without the use of conducting vias.

The battery substrate 88 serves as part of the spacecraft support structure, and as a holder for batteries, and contains electrical vias for DC power connections to other layers. The substrate also has recesses and vias for receiving and distributing electrical power. The substrate 88 provides support structure, thermal heat-sinking of components, containment of batteries, and electrical interconnects between the batteries and the spacecraft power bus. The processor substrate 90 serves as part of the spacecraft support structure, a thermal heat sink for electronics, and as an interconnect system for spacecraft processors and associated electronics. It contains electrical vias for DC power connections to other layers. The substrate 90 is made with recesses and vias. The antenna substrate 92 serves as part of the spacecraft support structure, an interconnect system between antennas and RF electronics, and an antenna support. The substrate 92 contains RF vias and cutouts to support various antenna configurations such as patch antennas. The substrate 92 is part of the support structure and a thermal heat-sink for electrical components, and provides electrical interconnects between the spacecraft RF communications system and various antennas.

The top surface of the dome 80 can be laser milled or laser exposed, baked, and etched, for providing a star tracker cavity 95 into which is received a star tracker image 94 that passes into the star tracker cavity 95 and through a star tracker lens 96 to a star tracker imaging processor 97. The cavity 95 can be open space or a glass ceramic insert. The dome 80 is further laser milled or laser exposed, baked, and etched, to provide a plurality of phased array antenna feeds 98 and respective phased array antenna dishes 100 distributed over the outer surface of the dome in a conventional phased array configuration. The star tracker image 94 is the optical wavefront pattern of visible emitters in the universe, as a stream of photons from optically-emitting bodies in space, such as stars, planets, moons, and nebulae. The optical image 94 provides orientation information for the spacecraft. The star tracker lens 96 is used to focus incoming photons from the various light-emitting bodies in the universe onto an image detector for determining spacecraft attitude. The lens 96 can be any optically-transparent material, including glass ceramic materials, that have the correct shape and refractive index to focus parallel light rays from a source at infinity onto a detector array. Transparency to visible radiation is normally required, but can be extended to UV, X-ray, or IR terahertz or millimeter wavelengths as needed. The lens focuses incoming electromagnetic energy onto an image detector. The star tracker imaging processor 97 includes a star tracker image detector. The star tracker imaging processor 97 processes output signals from the star tracker image detector and calculates spacecraft orientation. The processor 97 is preferably a digital processor that runs algorithms to first determine what part of the sky the sensor is seeing, and then determines the spacecraft orientation. Normally, only relative star positions on the image detector are used to determine spacecraft orientation. The star tracker imaging processor 97 takes raw image data from the star tracker imaging detector and provides a digital output with spacecraft orientation information to the spacecraft central processor 182. The phased array antenna feed network 98 includes antennas feeds at the correct phase to provide the desired phased array antenna gain pattern. The phased array antenna network 98 can have passive structures to provide a fixed antenna pattern, or it can provide controllable phases and amplitudes to various antennas to generate various antenna beam angles and beamwidths. The phased array antenna network 98 can be a patterned conductive layer deposited on the glass and ceramic substrate radome 80. The phased array antenna network 98 feeds and dishes 100 may also contain active components such as amplifiers, RF switches, phase shifters, and attenuators for antenna operation. The antenna dishes 100 have recesses that can be laser milled or laser exposed, baked, and etched after molding, or can be formed during the molding process. Deposition and patterning of the conducting layer can be performed before or after molding. Ductile conductors can be applied before molding, brittle conductors can be applied after molding, and metal doping can occur before or after molding. The phased array antenna feed network 98 is used to coherently combine signals from multiple antennas to provide the required antenna gain properties such as gain, beamwidth, and beam direction. The phased array antenna dishes 100 couple RF radiation between antenna feeds and free-space. Antennas feeds 98 and dishes 100 can have conductors in various configurations, such as for dipole antennas, dipole coupled with RF reflectors, quarter-wave antennas coupled to parabolic dishes, or simple conductors coupled with dielectric focussing elements, such as lenses. The antenna system includes the phased array network 98 and dishes 100 provide a desirable antenna gain pattern for spacecraft communications, radar, RF, and microwave power beaming, or remote sensing. The fuel reservoir 102 provides propellant storage volume for the spacecraft. As should now be apparent, the integrated dome 80 serves as a star tracker support, a phased array antenna support, a reservoir for propellant, as well as a glass ceramic integrated support for the entire spacecraft. The dishes 100 can be made by laser milling the molded dome, or by UV laser patterning, baking and etching.

The dome 80 is further used for defining a fuel reservoir 102 containing a propellant for thrusting the spacecraft using a right fuel control valve 104 and a left fuel control valve 106. The left valve 106 is used to control fuel flow into a left thruster plenum 108 and out a left thruster nozzle 110. The right valve 104 is used to control fuel flow into a right thruster plenum 112 and out a right thruster nozzle 114. The fuel reservoir 102 is formed by the molding. The fuel reservoir 102 contains propellant that will travel through the propellant feed lines and into the plenums 108 and 112 of the thrusters. The right and left fuel control valves 104 and 106 modulate the flow of propellant from the reservoir 102 to one of the thrusters. The valves 104 and 106 provide modulated fuel flow restrictions, The flow restriction can be modulated using magnetic force, such as by solenoid valves, pneumatic pressure such as by hydraulic valves, and electric force such as by electrostatic MEMS valves, piezoelectric force by piezoelectric materials, or thermally-generated mechanical force by bimorph actuators or by material expansion and freezing. The valves 104 and 106 are disposed into a propellant cavity 102. The valves 104 and 106 can be on and off valves or metering valves to provide variable flow rates and hence variable thrusts. The left and right thruster plenums 108 and 112 are used to provide a propellant cavity upstream of the thruster nozzles 110 and 114. The plenum cavities 112 and 108 have a larger diameter than the propellant feed line, and the linear propellant speed through the plenum is smaller than the linear speed through the propellant feed line. Reduced propellant speeds upstream of the nozzle improve thruster efficiency. In bipropellant thrusters, reacting chemicals are typically brought together in the low-velocity plenum to create a high temperature gas. In electrothermal thrusters, heat is added by resistors, arcs, or RF power. The plenums 112 and 108 connect a propellant feed line to a thruster nozzle with high efficiency. The left and right thruster nozzles 110 and 114 convert propellant enthalpy heat energy into directed kinetic energy thrust, The nozzles 114 and 110 include a converging section with decreasing cross section along the flow direction followed by a diverging section with increasing cross section along the flow direction. The flow accelerates in the converging section until it reaches sonic velocity at which point a diverging section serves to further accelerate the supersonic flow.

The left control valve 106 and the right valve 104 receive power through vertical power interconnects 116 extending through a vertical power feedthrough 117 that passes through substrates 90, 88, 86, 84, 82, and dome 80. The vertical electrical interconnects 116 in the feedthrough 117 provide electrical connections. The interconnects 116 and feedthrough 117 allow DC power and electrical signals to be distributed. The interconnects 116 can be spring-loaded electric interconnects fabricated on the glass ceramic substrate, or metallic pads fabricated on an undercut substrate which uses a glass ceramic spring that is a straight or curved beam that has compliance normal to the substrate surface. The interconnects 116 connect various components in respective substrates together and provides an external attachment point for connecting the spacecraft to power sources and test equipment. These attachment points can be used for ground-based tests and for monitoring the spacecraft on the launch vehicle.

The left valve 106 receives left optical control signal through an left vertical optical path 118 and receives power through a left control valve feedthrough 120. The right valve 104 receives right optical control signal through a right vertical optical path 122 and receives power through a right control valve feedthrough 124. A top horizontal communications interconnects 123 extend from vertical interconnects 116 so as to route power to the valves 104 and 106. Left and right control valve feedthroughs 120 and 124 contain an electrical conductor that passes through the glass ceramic substrate 82. The feedthroughs 120 and 124 provide power and control signals to the left and right control valves 106 and 104. The optical paths 118 and 122 and feedthroughs 120 and 124 serve to provide power and control signals to the valves 104 and 106 for providing control thrust from the opposing nozzles 114 and 110, respectively. The vertical optical paths 118 and 122 enable photons to travel through the substrates to the valves 106 and 104 for thruster control.

The photons travel in straight-line free-space paths can be processed by photonic devices, such as reflectors, absorbers, or diffracting elements, The photons can also travel in optical waveguides. The plenums 108 and 112, nozzles 110 and 114, feedthroughs 117, 120 and 124 can be made by laser milling the thruster substrate 82, or by laser patterning, baking, and etching.

A variety of sensors may be disposed in the sensor substrate 84. The sensor substrates includes a gyro sensor cavity 126 in which is disposed a gyro sensor 128. A passive sensor cavity 130 in which is disposed a passive sensor 132 comprising an optical transceiver communicating over a passive optical path 134. An active sensor cavity 138 in which is disposed an active sensor 136 has an exemplar optical transceiver 140 communicating over an active sensor optical path 142. The gyro sensor cavity 126 is a cavity that contains a gyro or rate gyro that is a gyro sensor 128. The gyro sensor or rate gyro sensors 128 uses a rotating mass or vibrating mass to provide an inertial frame of reference. Changes in rotation or vibration of the mass indicate a change in orientation. The gyro sensor 128 may be a conventional gyro or a MEMS gyro fabricated directly in the glass ceramic substrate 84. The gyro or rate gyro 128 provides information on the either current orientation, or current angular rates-of-change from a previously known initial orientation and rotation rate. The horizontal electrical interconnects 123 is used to communicate signal from the gyro 128 as well as drive and feedback signals from the valves 104 and 106, for interconnection to the interconnects 116 as part of the electrical distribution grid. The gyro sensor 128 communicates with the central processor 182 to provide current orientation information, or current angular rates-of-change, from a previously known initial orientation and rotation rate. The passive sensor 132 is disposed in the passive sensor cavity 130. The passive sensor 132 modulates an optical beam 134, to provide data on temperature, vibration, pressure, or magnetic field. The passive sensor does not consume power, but it reflects incoming light. Information can be superimposed on the reflected light as an amplitude, phase, or beam angle modulation. Pressure can be sensed by the mechanical deformation of a thin diaphragm that is coated with a reflecting material. The returned light will be deflected in angle. A cantilever beam of sandwiched bimorph materials can cause a similar deflection of angle as temperature changes. Magnetic fields can be sensed using an optically-reflective ferromagnetic coating on the end of a cantilever beam, Bragg gratings, used in fiber optic sensors, can be fabricated in the glass ceramic material to provide stress information. The Bragg grating can be fabricated along a top or bottom layer surface using narrow channels cut using either laser milling or UV-exposed using laser or photolithographic chemical etching. The passive sensor 132 requires an optical input beam and a reflected light receiver, such as optical transceiver 186 which may be part of the communications processor 172. The passive optical sensor path 134 is the path that the incident and reflected light takes within the glass and ceramic support structure. The light travels in straight-line free-space paths unless encountering internally-reflecting components such as reflector 152, absorbers, diffracting elements, or other photonic devices, such as an optical waveguide. The optical path 134 connects optical sources, sensors, and transceivers.

The active sensor 136 produces an analog or digital output in response to voltage, current, or an environmental condition such as stress, temperature, pressure, or magnetic field. The active sensor 136 is an integrated circuit, module, or component. The sensor 136 provide environmental and spacecraft health data to the central processor 182. The active sensor 136 is disposed in the cavity 138 within the glass ceramic substrate 84. A sensor optical transceiver 140 generates photons and contains a photo detector to detect incoming photons. The photon generator can be a light emitting diode, a diode laser, gas discharge, or a hot filament. The photon detector can be a single detector, a linear array, or a two-dimensional detector to provide angle detection capability. The optical transceiver 140 can includes a number of components such as diode lasers and CMOS image sensors integrated together on a common substrate, or disposed on the glass ceramic substrate 84. Wavelength dispersing elements can be fabricated in the glass ceramic substrate 84 for improved optical communications. The sensor optical path 142 passes optical signals from the active sensor 136, passive sensor 132, and the optical transceiver 140. The optical signals travel in path 142 through the glass ceramic substrates 84, 86, 88 and 90 as part of an optical communication grid having straight-line free-space paths, or reflected and diffracted paths, or optical waveguides.

A variety of photonic devices, such as optical splitters, filters, polarizers, fibers, lenses, and like optical means may be disposed in an optical substrate 86. The exemplar optical substrate includes a passive sensor beam splitter cavity 144, a left beam splitter cavity 146, a right beam splitter cavity 148, and an active sensor beam splitter cavity 150. The passive beam splitter cavities 144, 146, 148, and 150 can be a triangular trench 152, 154, 156, and 158 in the glass ceramic substrate 86 to create optical beam splitters, or photonic devices 152, 154, 156, and 158 can be air gap slots cut at a desired angle. These beam splitters connect to the optical path 160 which is a horizontal optical data bus as part of the optical communications grid. The passive sensor beam splitter cavity 144 supports a passive sensor beam splitter 152. The left beam splitter cavity 146 supports a left beam splitter 154. The right beam splitter cavity 148 supports a right beam splitter 156. The active sensor beam splitter cavity 150 supports an active sensor beam splitter 158. In the preferred form, a horizontal optical path 160 extends through each of the beam splitters for interconnecting optical paths 134, 118, 122, and 142. The horizontal optical path 160 also extends through an optical fiber 162 and an optical fiber lens 163 for external optical communication suitable for communications with another spacecraft or host craft in which the glass ceramic spacecraft may be stowed. The optical communication grid can include an optical fiber 162 and lens 163 for optical communications with an external optical system, not shown. The optical fiber 162 is a waveguide for UV, visible, or IR photons. The fiber 162 is usually a cladded glass or plastic fiber that can also be fabricated in the glass ceramic material. The lens 163 efficiently couples light between optical transceivers, optical fibers, and free-space. The lens 163 is used to focus and couple free-space photons into or out of the optical fiber 162. The lens 163 is usually a glass or plastic lens, but can also be fabricated in the glass ceramic substrate 86.

The battery substrate 88 includes a battery cavity 168 in which is disposed a right battery 164 and a left battery 166. The battery substrate is bonded to the processor substrate 90 that provides power for charging the batteries 164 and 166 during solar sunlight exposure or that receives power from the battery during solar eclipses. The right and left batteries 164 and 166 disposed in the battery cavity 168 store electric energy as chemical energy. Multiple batteries in series provide an output voltage that is an integral number of the cell voltage. Power feedthrough 169 serves to conduct electrical power lines to and from the batteries 164 and 166.

The processor substrate 90 includes a communications processor cavity 170 in which is disposed a communications processor 172 having a built in optical transceiver for optical communications along optical path 134, includes a power converter cavity 174 in which is disposed a power converter, and includes a central processor cavity 178 in which is disposed an exemplar metal hybrid can 180 that encloses a central processor 182 and an RF transceiver 184 and in which is disposed a central processor optical transceiver 186 for optical communications along optical path 142. The glass ceramic substrate provides mechanical structure and thermal control for electronic devices. The communications processor 172 includes RF transceivers coupled with digital central processor 182 and provides spacecraft communications with the outside universe for commands, telemetry transmission, and payload data transmission. The power converter cavity 174 is a cavity in the glass ceramic substrate 90 that houses the power converter 176. The glass ceramic substrate 90 provides thermal control and support for the power converter 176. The power converter 176 is an electronic circuit that takes one input voltage and produces one or more different output voltages for various spacecraft functions. The power converter 176 receives output voltages from left and right solar cell panels 194 and 196 for charging the spacecraft batteries and operating various devices distributed about the spacecraft through the electrical communications grid. A central processor cavity 178 houses the hybrid 180 including the central processor 182 and the RF transceiver 184. The cavity 178 in the glass ceramic substrate provides support and thermal control. The hybrid metal 180 has a conducting surface for RF shielding for internal components 182 and 184. The conducting coating can also be applied to the cavity 178. The central processor 182 is a digital integrated circuit that provides central control to operate the spacecraft. The central processor 182 receives commands from the RF transceiver 184, operates the various spacecraft systems, and formats data for transmission to the ground. The RF transceiver 184 is an RF circuit that receives signals from within the spacecraft, amplifies the incoming signals, and translates them to a lower frequency where digital circuitry can extract data from phase or amplitude information. The circuit 184 also receives digital data from the processor 182 and modulates an RF output for transmission to other RF transceivers and devices within the spacecraft as part of the electrical communications grid. The optical transceiver 186 generates photons and contains a photo detector to detect incoming photons. The photon generator can be a light emitting diode, a diode laser, a hot filament, or a gas discharge. The photon detector can be a single detector, a linear array, or a two-dimensional detector to provide angle detection capability. The sensor optical transceiver 186 links various active and passive optical sensors, and other optical transceivers, with he central processor 182. The communications processor 172 links the passive optical sensors and other optical transceiver with the central processor 182. The processor 172 also contains RF circuitry for communications with the outside universe. The passive optical sensors require a wavelength dispersing element, such as a prism or diffraction grating. The wavelength dispersing elements can be fabricated in the glass ceramic substrate 90 as well.

The electrical interconnects 123 and 116 are further interconnected to bottom horizontal communications interconnect 188 by vertical power and signal interconnects 116. The bottom horizontal communications interconnects 188 include conductor traces that provide power and data transfer between communications and processor components. The bottom horizontal communications interconnect links the communications processor 172, the power converter 176, the central processor 182, the RF transceiver 184, and the central processor optical transceiver 186 with the remaining components of the system as part the electrical communication grid. It is now apparent that the RF transceiver 184 provides for RF communications within the spacecraft. The optical transceiver of the communication processor 172, the central processor optical transceiver 186, active sensor optical transceiver 140, the fiber optics 162, the fiber lens 163, and the beam splitters 152, 154, 156, and 158, as well as the glass ceramic substrates 82, 84, 86, 88, and 90 provide an optical communications grid about the spacecraft.

A right solar cell feedthrough 190 and a left solar cell feedthrough 192 route power lines respectively from a right solar cell panel 194 and from a left solar cell panel 196 to the power converter 176 for collecting and distributing power to charge the batteries 164 and 166 and to power other electronic devices including the communications processor 172, the central processor 182, RF transceiver 184, the active sensor 136, the active sensor optical transceiver 140, and valves 104 and 106. The operational devices of the spacecraft include fluidic devices, such as valves, pumps, tubes, nozzles, filters, among many others. The right and left solar cell feedthroughs 190 and 192 are conductive traces that pass through the glass ceramic substrate 92 for DC power transfer. The right and left solar cell panels 194 and 196 may include semiconductor p-n junctions that convert incoming solar light into DC current at a predetermined voltage. The solar cell panels are bonded to the substrate 92. Normally, solar panels are bonded on the outside of the spacecraft. With transparent glass structure, solar panels can be mounted inside the spacecraft as the substrates can be light transmissive. Electrical power and communication signals are also communicated over interconnects 188 through an imager feedthrough 198 to an imager 200 having an imaging lens 202. Electrical power and communications signals are also communicated over interconnects 188 through an attitude optical sensor feedthrough 204 to an attitude optical sensor 206 having an attitude optical sensor lens 208. RF communications signals are also communicated over interconnects 188 through a patch antenna feedthrough 210 to a top patch antenna 212 and a bottom patch antenna 214 for external RF communications. The imager feedthrough 198 includes conductive traces that pass through the glass ceramic substrate 92 to provide data transfer along the interconnects 188. The imager feedthrough 198 takes imager data from the imager 200 and transfers the imager data to the central processor 182 through the bottom horizontal communications interconnects 188. The imager 200 is an image sensor including an integrated lens 202. The imager 200 provides Earth observation or spacecraft images for the central processor 182. An attitude optical sensor feedthrough 204 includes conductive traces that pass through the glass ceramic substrate 92 to provide data transfer. The attitude optical sensor feedthrough 204 communicates attitude sensor data through the bottom horizontal communications interconnect 188 to the central processor 182. The attitude optical sensor 206 may be a CCD, CMOS, or MEMS image sensor, coupled with a lens 208 that images the Earth, sun or stars. The imager attitude information is based on the position of the sun, Earth, or stars in the image. MEMS image sensors may be composed of microbolometer sensor array fabricated on glass ceramic substrate 92 using conventional semiconductor processing techniques. The patch antenna feedthrough 210 includes conducting traces and connects the patch antenna to the RF bus of the interconnects 188. The feedthrough 210 enables patch antennas communications. The patch antenna includes a top patch antenna 212 and a bottom patch antenna 214. A conductive pattern, located over a dielectric, but not touching a larger conductive pattern below, can function as a flat patch antenna with moderate gain. The patch antennas 212 and 212 can be used as moderate-gain omnidirectional antennas for RF communications.

It is now apparent that the spacecraft includes an electrical communications grid comprising lines 116, 123, and 188 as well as electrical lines extending through feedthroughs 120, 124, 169, 117, 192, 190, 198, 204 and 210 for power distribution and electrical digital and analog communications about the ceramic spacecraft, as well as comprising any internal RF communications. The electrical communications grid also includes free-space RF transmissions within the spacecraft. It is now equally apparent that the spacecraft includes an optical grid of optical paths 118, 122, 134, 142, and 160 horizontally and vertically extending through substrates 82, 84, 86, 88, and 90 for communicating optical signals about the spacecraft. That is, the electrical interconnects using horizontal planar traces 123 and 128, and feedthroughs 120, 124, 117, 190, 192, 198, 204 and 210 communicate electrical power and RF signals while the glass ceramic structures 82, 84, 86, 88, and 90 through optical paths 118, 122, 134, 142, and 160 enable optical communications so as to provide a comprehensive dual optical and electrical communications network throughout the spacecraft.

The invention is directed to an integrated glass ceramic system having a plurality of glass ceramic supports made from glass ceramic materials integrated as a system support structure including a communications network as an electrooptic communications network having an electrical communications grid and an optical communications grid. The glass ceramic material include amorphous glass, ceramics, and composites of glass and ceramics. In the preferred form, the glass ceramic materials are photostructural glass ceramic materials having a photosensitizing agent for photon exposure. The photon exposures, such as UV laser exposure, is suitable for direct-write patterning of features. The photon or laser exposures are also suitable for localized ceramicization of a glass ceramic support. The supports can be locally ceramicized, tempered or anneal for improved strength. The support can be annealed for improved internal optical communications along internal free-space optical communications paths. Various glass and ceramic materials can be used. Those skilled in the art can make enhancements, improvements, and modifications to the invention, and these enhancements, improvements, and modifications may nonetheless fall within the spirit and scope of the following claims.

What is claimed is:

1. An integrated glass ceramic system for providing internal communications, comprising,
   a plurality of glass ceramic components, one of the glass ceramic components being a patterned component made of a photostructurable glass ceramic material, the glass ceramic components are coupled together for forming a support structure,
   operational devices supported by the support structure, two of the operational devices are optical devices for communicating an optical signal through one of the glass ceramic material components providing an optical path along which is communicated the optical signal, two of the operational devices are electronic devices for communicating an electrical signal through one of the glass ceramic material components providing an electrical path along which is communicated the electrical signal, and
   an optoelectronic communications grid enabling intercommunications of the electrical signal between the two electronic devices along the electrical path and enabling intercommunications of the optical signal along the optical path and between the two optical devices.

2. The system of claim 1 wherein,
   the operational devices are selected from the group consisting of electronic and electrical and photonic and fluidic and microelectromechanical systems devices.

3. The system of claim 1 wherein,
   the electrooptical communications grid comprises an electronic and electrical communications grid and an optical communications grid, the optical communications grid comprising a free-space optical communication path through one of the glass ceramic materials.

4. The system of claim 1 wherein,
   the patterned components are direct-write laser milled components, photolithographic exposed and baked and etched components, and direct-write laser exposed and baked and etched components.

5. The system of claim 1 wherein,
   the operational devices comprise photonic devices for communicating optical signals through the optical communications path.

6. The system of claim 1 wherein,
   the operational devices comprise photonic devices for communicating optical signals through the optical communications path, the photonic devices selected from the group consisting of optical transceivers and optical transmitters and optical receivers and optical detectors and mirrors and splitters and reflectors, polarizers and lenses and optical fibers.

7. The system of claim 1 wherein,
   one of the glass ceramic components is a molded component.

8. The system of claim 1 wherein,
   one of the glass ceramic components is an annealed component.

9. The system of claim 1 wherein,
   one of the glass ceramic material components is a tempered component.

10. An integrated glass ceramic system for providing internal communications, comprising,
    a molded component made of a photostructurable glass ceramic material,
    a patterned component made of a photostructurable glass ceramic material, the molded component and patterned component are coupled together for forming at least part of a support structure,
    electrodevices encapsulated within and supported by the support structure,
    optodevices encapsulated within and supported by the support structure, and
    an electrical communications grid for enabling intercommunications between the electrodevices devices, and
    an optical communications grid for enabling optical intercommunications between the optodevices.

11. The system of claim 10 wherein
    the electrodevices are selected from the group consisting of electronic, electrical and microelectromechanical systems devices, the optodevices are elected from the group consisting of optical transceivers and optical transmitters and optical receivers and optical detectors and mirrors and splitters and reflectors and polarizers and lenses and optical fibers.

12. The system of claim 10 wherein, the support structure provides an optical path within the optical communications grid.

13. The system of claim 10 wherein, the support structure defines a housing encapsulating the electrodevices and optodevices.

14. An integrated glass ceramic system for providing internal communications, comprising, patterned components made of a photostructurable glass ceramic material, the patterned component are coupled together for forming a support structure, one of the patterned components is a molded patterned components, one of the patterned components is a tempered patterned component, electrodevices encapsulated within and supported by the support structure, optodevices encapsulated within and supported by the support structure, an electrical communications grid for enabling intercommunications between the electrodevices devices, and an optical communications grid for enabling optical intercommunications between the optodevices and for enabling the external communications, one of the components provides an optical path within the optical communications grid.

15. The system of claim 14, wherein the electrodevices and optodevices comprise a sensor.

16. The system of claim 14, wherein the support structure defines a housing encapsulating the electrodevices and optodevices.

17. The system of claim 14, wherein, the support structure defines a housing and provides an optical communications path for enabling the external communications.

18. The system the claim 14 wherein, the optical communications grid comprises a free-space path through one of the patterned components.

19. The system of claim 14 wherein, the electrical communications grid comprising a conducting feedthrough path through one of the patterned components.

\* \* \* \* \*